FIG. 1

INVENTOR.
William R. Hunsicker

INVENTOR.
William R. Hunsicker

United States Patent Office 2,872,676
Patented Feb. 3, 1959

2,872,676

RADIO LOCATION SYSTEM

William R. Hunsicker, Tulsa, Okla., assignor to Seismograph Service Corporation, Tulsa, Okla., a corporation of Delaware Application April 23, 1954, Serial No. 425,271

17 Claims. (Cl. 343—105)

The present invention relates to radio location systems, and more particularly to improvements in radio location systems of the continuous wave phase comparison type.

Radio location systems of the class mentioned usually comprise position signal transmitters located at three or more known geographically separated points, and receiving facilities aboard each mobile craft the position of which is to be determined by receiving the signals radiated from the position signal transmitters. In such systems, the continuous waves radiated from each pair of transmitters produce standing waves in space, the phase relationship of which changes as a function of changing position between the two transmitting points. More specifically, the standing waves produced by each pair of transmitters of the system are characterized by iso-phase lines which are hyberbolic in contour about the transmitting points as foci. On a line connecting the pair of transmitters, these iso-phase lines are spaced apart a distance equal to one-half the mean wave length of the radiated waves and have diverging spacings at points on either side of this base line. With this system arrangement, the position of a receiving point relative to a pair of adjacent hyperbolic iso-phase lines, or more particularly within the lane defined by a pair of adjacent hyperbolic iso-phase lines, may be determined by measuring the phase relationship between the continuous waves radiated from the pair of transmitters. However, since the point of location of the receiving point along the lane within the two iso-phase lines is not indicated by such a phase measurement, it becomes necessary to employ at least three spaced transmitters, different pairs of which function to provide a grid-like pattern of intersecting lanes defined by the intersecting hyperbolic lines, in order to obtain absolute determination of the position of the receiving point. While systems of the character described are exceedingly accurate insofar as the position indications produced at the receiving point are concerned, they are characterized by a number of problems which have been found to be quite difficult to solve. Thus in order to obtain the desired indication accuracy, it is necessary so to arrange the system that phase shifts between the radiated waves are either eliminated or are compensated for during the phase comparing operation. This problem has been solved in a simple and reliable manner by utilizing the so-called "heterodyne principle" disclosed and broadly claimed in Honore Patent No. 2,148,267.

Another problem encountered in the operation of continuous wave systems is that of eliminating ambiguity from the phase measurements which provide the desired position information. Thus while the two phase measurements described above identify the position of the receiving point within two intersecting lanes defined by two intersecting pairs of hyperbolic iso-phase lines, they do not indicate the particular pair of lanes in which the indications are obtained. This means that in operating such systems, the geographic location of the receiving point relative to the transmitting stations must be known at the start of movement of the mobile craft on which the receiving equipment is located and, moreover, that the successive lanes traversed by the receiving point must be counted as the receiving point is moved relative to the grid-like pattern of hyperbolic lines defining the various lanes. It also means that a mobile craft entering the radiation pattern of the transmitters cannot utilize the radiated signals to determine its position without employing auxiliary equipment to determine the approximate position of the craft relative to the position signal transmitter. Various arrangements have been proposed for overcoming this so-called lane ambiguity problem. By far the most promising solution to the lane ambiguity problem yet discovered, relates to a system arrangement in which the difference frequency principle as disclosed and claimed in Hawkins Patent No. 2,652,558, granted September 15, 1953, is used to produce position indications having separate sensitivities, termed phase sensitivities, insofar as the lane widths or spacing of the iso-phase lines is concerned. More specifically, a plurality of low phase sensitivity position indications and a plurality of high phase sensitivity position indications are derived from signals which are radiated in pairs from each of the geographically separated signal transmission points, the low phase sensitivity indications being effective to locate the range of the high phase sensitivity indications and being characterized by widely spaced phase coincidences, representing large lane widths, and the high phase sensitivity indications being characterized by closely spaced phase coincidences, representing small lane widths. The high and low sensitivity indications are obtained by concurrently radiating at least two signals from each of the transmitting points, producing pairs of beat frequency signals in accordance with the heterodyne principle described in the Honore patent, and then heterodyning the resultant beat frequency signals to produce position indicating and reference signals for phase comparison which have phase sensitivities determined by phantom frequencies corresponding to the difference between the mean frequencies of the carrier waves from which the pairs of beat frequency signals are derived.

By utilizing the so-called difference frequency lane ambiguity resolution feature in combination with the heterodyne principle, the problem of phase synchronization between widely separated transmitters and the problem of lane identification, i. e., identification of the particular high phase sensitivity lanes within which a receiving point is located, are completely obviated. However, practical utilization of these principles in combination involves simultaneous radiation of two signals having closely spaced frequencies from each of the transmitting points. More specifically, it may become necessary to radiate two signals having frequencies separated by as little as one kilocycle simultaneously from the radiating antenna at each of the transmitting points. This gives rise to the problem of introducing high powered signals of closely related frequencies into the antenna circuit at each of the transmitting points without generating strong intermodulation or side band components which not only interfere with operation of the receiving units of the system, but may result in objectionable interference in frequency bands other than the band in which the two primary signal frequencies fall. Prior efforts to solve this instrumentation problem have been limited to the use of entirely separate signal transmission channels between the two signal generators and the antenna circuit and the provision of very sharp band pass filters, tuned to the respective frequencies of the two signals to be radiated, in the two signal channels at points immediately preceding the antenna circuit. Due to the signal power requirements normally encountered in any practical system, these filters must be capable of handling large currents at very high peak voltages with the result that large and very costly circuit components must be used therein. Moreover, filters having the requisite sharpness, i. e., frequency rejection characteristics, are not only very difficult to tune to the desired frequency but are equally difficult to maintain tuned to the desired frequency under conditions of varying temperature and humidity. Furthermore, in order to avoid having spurious radiations of excessive values, the signal rejection characteristics of known types of filters is such that the minimum frequency separation obtainable is about five percent of the frequencies under consideration, or about 100 kilocycles at the frequencies utilized in the present improved system. Thus the problem of radiating at least two signals having closely related frequencies simultaneously from each of the transmitting points of a radio location system of the character described without spurious generation and radiation of strong side band or intermodulation components has been a serious problem in practical utilization of radio location systems of the improved form herein described.

It is an object of the present invention, therefore, to provide an improved radio location system of the character described, utilizing simultaneous transmission of two or more signals having closely related frequencies from at least one of a plurality of signal transmission points, in which the above mentioned problem of simultaneous signal radiation without the generation of strong side band or intermodulation components is entirely eliminated in a simple, economical and reliable manner.

According to another object of the present invention, the problem of simultaneously radiating two signals having closely related frequencies from one or more of the transmission points of the system is entirely obviated without resorting to the use of high cost filters having relatively unstable signal transmission characteristics.

It is a further object of the invention to provide an improved transmission system for use in radio location systems of the character described which is free from the above mentioned difficulty.

It is still another object of the invention to provide a radio position finding system of the character described which combines economy of the frequency spectrum required with freedom from phase synchronization problems and yet provides precise and non-ambiguous position indications to any desired number of system users.

It is a still further object of the invention to provide a radio position location system of the character described which is so arranged that both high phase sensitivity and low phase sensitivity position indications may be obtained at any number of receiving points while employing a minimum number of position indicating signal frequencies which are suitable for efficient long range propagation and certain of which may be relatively closely related in frequency and simultaneously propagated from the same transmission point.

The invention, both as to its organization and method of operation, together with further objects and advantages thereof, will best be understood by reference to the following specification taken in connection with the accompanying drawings, in which.

Figure 1:
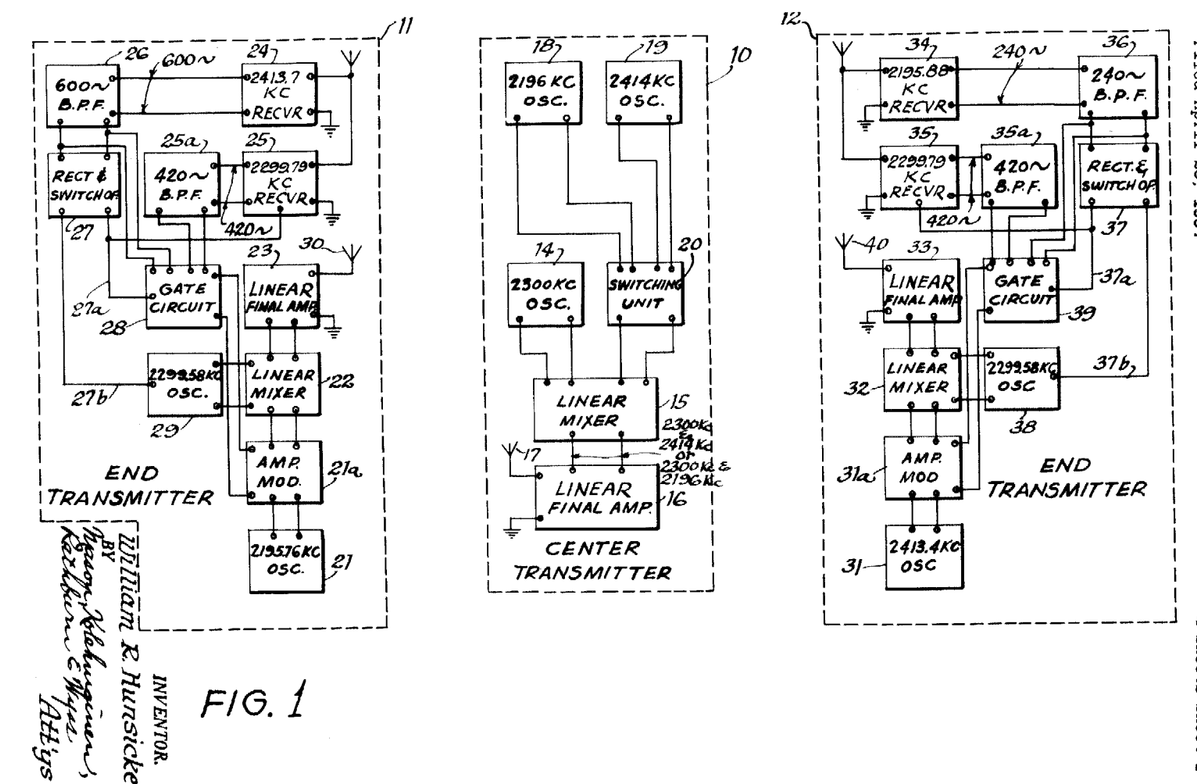
Figs. 1 and 2 when laid one above the other in the order named diagrammatically illustrate an improved radio location system characterized by the features of the present invention, the transmission facilities of the system being shown in Fig. 1 and one of the receivers being shown in Fig. 2.
Figure 2:
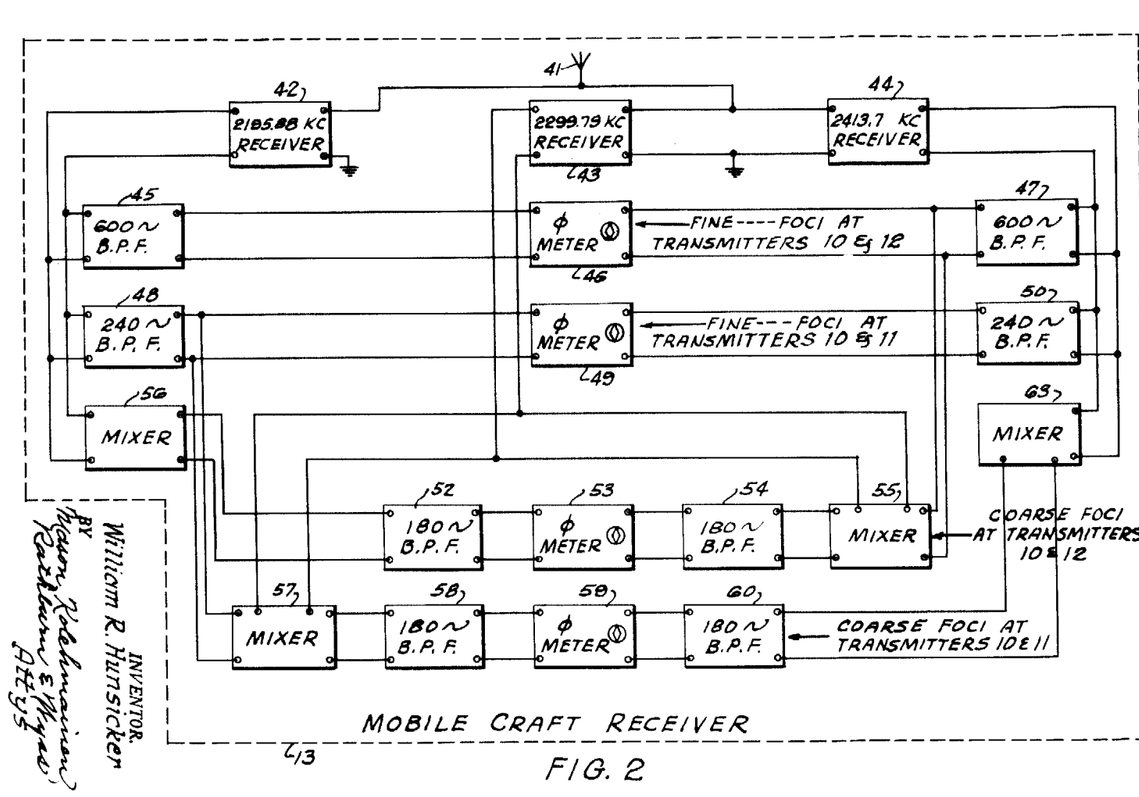

Referring now to the drawings and more particularly to Figs. 1 and 2 thereof, the present improved radio location system there illustrated comprises three geographically separated transmitters or transmitting units 10, 11 and 12 for radiating position signals to any number of mobile receiving units, one of which is generally identified by the reference numeral 13 (Fig. 2) which may be carried by vessels or vehicles operating within the radius of transmission of the three identified transmitting units. The center transmitter 10 is preferably spaced at approximately equal and relatively large distances from the end transmitting units 11 and 12 and these three units are so positioned that the line bisecting the points of location of the radiating antennas 17 and 30 of the units 10 and 11 is angularly related to the line disecting the points of location of the radiating antennas 17 and 40 of the units 10 and 12.

Briefly considered, the equipment provided at the center transmitter 10 comprises three oscillators or signal generators 14, 18 and 19 which develop output signals having frequencies of 2300 kilocycles, 2196 kilocycles and 2414 kilocycles, respectively, a linear mixer circuit 15, a switching unit 20 for alternately impressing the signals developed by the signal generators 18 and 19 on one set of input terminals of the mixer 15, and a linear final amplifier 16 through which signals derived from the generator 14 and alternately derived from the two generators 18 and 19 are impressed upon the transmitter antenna circuit which includes the radiating antenna 17. The equipment provided at the end transmitter 11 includes two receivers 24 and 25 center tuned respectively to receive signals having frequencies of 2414 kilocycles and 2300 kilocycles from the transmitter 10 and to receive signals separated from these signals by only a few hundred cycles in frequency from the transmitter 12, a 600 cycle band pass filter 26 for selectively passing a 600 cycle beat frequency signal developed at the output terminals of the receiver 24, a 420 cycle band pass filter 25a for selectively passing a 420 cycle beat frequency signal developed at the output of the receiver 25, a rectifier and switch operator circuit 27 for selectively performing certain control operations described more fully below, and a gate circuit 28 for selectively passing beat frequency signals developed at the output sides of the two receivers 24 and 25 to the signal radiating facilities of the transmitter under the control of the rectifier and switch operator circuit 27. The signal radiating facilities of this transmitter comprise an oscillator or signal generator 21 which operates continuously and develops a signal output having a frequency of 2195.76 kilocycles, a modulator unit 21a for modulating the output signal of the generator 21 with 420 cycle and 600 cycle signals from the gate circuit 28, a second oscillator or signal generator 29 having an output frequency of 2299.58 kilocycles which is selectively operated under the control of the rectifier and switch operator circuit 27, a linear final amplifier circuit 23 through which signals from one or both of the generators 21 and 29 are fed to a single antenna circuit including a radiating antenna 30, and a linear mixer circuit 22 through which signals from the two generators 21 and 29 are impressed upon the input terminals of the final amplifier 23. Similarly, the end transmitter 12 comprises two receivers 34 and 35 center tuned to receive signals having frequencies of 2196 kilocycles and 2300 kilocycles, respectively, from the transmitter 10 and to receive signals separated by only a few hundred cycles therefrom and radiated by the transmitter 11, a band pass filter 36 coupled to the output terminals of the receiver 34 and designed to pass a 240 cycle beat frequency signal, a band pass filter 35a coupled to the output terminals of receiver 35 for passing a 420 cycle beat frequency signal, a rectifier and switch operator circuit 37 which responds to the signal passed by the filter 36 to perform certain control operations described below, and a gate circuit 39 having the function of selectively impressing signals developed at the output terminals of the two receivers 34 and 35 upon the signal radiating facilities of the transmitter 12 under the selective control of the rectifier and switch operator circuit 37. The signal radiating facilities of this transmitter comprise a continuously operating oscillator or signal generator 31 having an output frequency of 2413.4 kilocycles, a modulator unit 31a for modulating the output signal of the generator 31 with 240 cycle and 420 cycle signals from the gate circuit 39, a second oscillator 38 which is intermittently operated under the control of the rectifier and switch operator circuit 37 and develops an output frequency of 2299.58 kilocycles, a linear final amplifier 33 through which signals from the gate circuit 39 and the signal generators 31 and 38 are impressed upon a single antenna circuit including an antenna 40, and a linear mixer circuit 32 through which signals developed by the two generators 31 and 38 are impressed upon the final amplifier 33.

As will be evident from the above description, a single radiating antenna is provided at each of the signal transmission points where the transmitters 10, 11 and 12 are located. Thus, one antenna circuit comprising the single antenna 17 is provided at the center transmitter to radiate signals from this transmitter. Similarly, a single antenna 30 is provided at the end transmitter 11 to radiate signals from this transmitter, and a single antenna 40 is provided at the second end transmitter 12 to radiate the signals from the latter transmitter. In this regard, it will be understood from the following description of the operation of the system that radiation of all signals produced at each transmitter from one and the same radiation point, i. e., from the same radiating antenna, is essential if the accuracy inherent in phase comparison systems of the character disclosed is to be fully realized. Moreover, the economics of antenna construction, system maintenance and chart production all dictate that not more than one antenna be used at each of the three signal radiating points of the system.

The described requirement that all signals emanating from each of the three transmitters 10, 11 and 12 be radiated from a single antenna at each transmitter gives rise to the above described problem of impressing two signals having almost the same frequencies on the same antenna circuit without developing strong and highly objectionable inter-modulation components between the signals which, unless suppressed, would be radiated by the antenna along with the desired signals. Thus, as described above, the center transmitter 10 simultaneously transmits signals having frequencies of 2196 kilocycles and 2300 kilocycles alternately with the simultaneous transmission of signals having frequencies of 2300 kilocycles and 2414 kilocycles, all such signals being radiated by the antenna 17. Again, during alternate halves of each operating cycle of the system, two signals having frequencies of 2195.76 kilocycles and 2299.58 kilocycles are simultaneously radiated from the antenna 30 embodied in the end transmitter 11. During the intervening half cycles of each operating cycle of the system, signals from the generators 31 and 38 having frequencies of 2413.4 kilocycles and 2299.58 kilocycles are simultaneously radiated from the antenna 40 embodied in the end transmitter 12. In accordance with an important feature of the present invention, the problem of preventing inter-modulation between the signals simultaneously impressed upon any one of the described antenna circuits is completely solved in an entirely simple and economical manner by employing signal channels having linear signal transfer characteristics to interconnect the signal generators of the respective transmitters with the antenna circuits embodied in the transmitters. Thus, an entirely linear signal transfer channel, completely devoid of such non-linear, inter-modulation component producing devices as diodes, class C amplifiers, and the like, and consisting of the linear mixer 15 and the linear final amplifier 16 is utilized to impress the signals generated by the signal generators 14, 18 and 19 upon the antenna circuit embodying the single antenna 17 at the center transmitter 10. Similarly, an entirely linear signal transmission channel consisting of the linear mixer 22 and the linear final amplifier 23 is utilized in transmitting signals from the two signal generators 21 and 29 to the antenna circuit embodying the antenna 30 in the end transmitter 11. Finally, an entirely linear channel consisting of the linear mixer 32 and the linear final amplifier 33 is provided for transmitting signals from the two signal generators 31 and 38 to the antenna circuit embodying the antenna 40 in the other end transmitter 12. As those skilled in the art will readily appreciate, the linear final amplifiers 16, 23 and 33 and the linear mixers 15, 22 and 32 may be of any one of a number of standard commercial types, none of which require expensive, nonstandard circuit components. The linear final amplifiers 16, 23 and 33, for example, may be operated either class A or class B, although the latter is somewhat preferable due to the increased efficiency of this mode of operation.

More specifically and as will be apparent from the above explanation, the final amplifiers 16, 23 and 33 are each required to handle signals within a relatively wide band, i. e., a bandwidth in excess of 100 kilocycles, a frequency of from 2196 to 2414 kilocycles. If class A final amplifiers 16, 23 and 33 are used, the wide band is of no consequence. However, such amplifiers are quite inefficient and, accordingly, it is preferable to use class B amplifiers as the final amplifiers. In a class B amplifier, however, the required wide band is associated with a decrease in the Q of the circuit, and hence a degradation of the linear characteristic of the amplifier, due to the decrease of the resonant character of the load circuit. This is essentially true of single ended class B amplifiers. However, it is not true, at least to the same extent, of push-pull class B amplifiers, which have the further desirable characteristic of minimizing harmonic distortion. Accordingly, the final amplifiers 16, 23 and 33 are preferably of the push-pull class B type. Provision of the described linear signal transmission channels consisting of the elements mentioned for transferring signal energy from the points of generation thereof to the antenna circuits of the three transmitters 10, 11 and 12 solves the problem of eliminating radiation of undesired signals developed through inter-modulation between the two signals which must be radiated simultaneously at each of the transmission points in an entirely simple, reliable and economical manner.

Referring now to the mobile craft receiver 13 as illustrated in Fig. 2 of the drawings, this receiver comprises a single antenna circuit including an antenna 41 for collecting signals radiated from the three transmitters 10, 11 and 12, and for impressing these signals upon the input terminals of three receivers 42, 43 and 44. The receiver 42 is center tuned to a carrier frequency of 2195.88 kilocycles and accordingly is designed to receive the 2195.76 kilocycle signal radiated from the transmitter 11 and the 2196 kilocycle signal radiated from the center transmitter 10. The receiver 43 is center tuned to a carrier frequency of 2299.79 kilocycles and accordingly is designed to receive and pass the 2300 kilocycle signal radiated from the center transmitter 10, the 2299.58 kilocycle signal radiated from the end transmitter 11 and the 2299.58 kilocycle signal radiated from the end transmitter 12. Finally, the receiver 44 is center tuned to a carrier frequency of 2413.7 kilocycles and accordingly is designed to receive and pass the 2414 kilocycle signal radiated from the center transmitter 10 and the 2413.4 kilocycle signal radiated from the end transmitter 12. The receiver 13 further comprises facilities including the 600 cycle band pass filters 45 and 47 and a phase meter 46 for providing fine or narrow lane position indications with reference to hyperbolic iso-phase lines having the signal radiating antennas 17 and 40 at the transmitters 10 and 12 as foci, coarse or wide lane position indicating facilities comprising the filter 47, two mixers 55 and 56, two additional 180 cycle band pass filters 52 and 54 and a phase meter 53 for producing indications with reference to widely spaced hyperbolic iso-phase lines also having the signal radiating antennas 17 and 40 at the transmitters 10 and 12 as foci. As explained more fully below, the described facilities are operative to produce fine and coarse position indications during periods when the signal generator 19 is operative to radiate signals from the center transmitter 10. The receiver 13 further comprises two 240 cycle band pass filters 48 and 50 and a phase meter 49 for providing fine or narrow lane position indications relative to hyperbolic iso-phase lines having the signal radiating antennas 17 and 30 as foci, and facilities including the filter 48, two additional 180 cycle filters 58 and 60, two mixers 57 and 63 and a phase meter 59 for providing coarse or wide lane position indications relative to hyperbolic iso-phase lines also having the antennas 17 and 30 of the transmitters 10 and 11 as foci. As described below, the last mentioned position indicating facilities provide position indications during periods when the signal generator 18 is operative to effect signal radiation from the transmitter 10 instead of the signal generator 19.

Referring now to the operation of the above described system as shown in Figs. 1 and 2, it is first pointed out that during alternate half cycles of each operating cycle of the system the switching unit 20 renders the signal generators 18 and 19 effective to radiate signals from the center transmitter 10. Preferably, the switching rate of the unit 20 is such that each operating cycle of the system persists for approximately one-fourth of a second, with the signal radiating periods of the two generators 18 and 19 being divided equally during each system operating cycle. During each half cycle when the switching unit 20 is conditioned to pass signals developed by the generator 18 and block the transmission of signals generated by the generator 19, the signals produced by the two generators 14 and 18 are mixed by the mixer 15 without the production of inter-modulation components therebetween and impressed upon the input terminals of the linear final amplifier 16 for amplification following which they are impressed upon the antenna circuit embodying the antenna 17 for radiation. Throughout operation of the system, the signal generators 21 and 31, respectively, provided at the end transmitters 11 and 12 are effective to produce signal radiation from the transmitters in which they are respectively embodied. Thus, during each period when the generator 18 is effective to produce signal radiation from the center transmitter 10, this transmitter radiates two signals having frequencies of 2196 kilocycles and 2300 kilocycles, the end transmitter 11 radiates the signal of 2195.76 kilocycles developed by the signal generator 21 and the end transmitter 12 radiates the signal of 2413.4 kilocycles developed by the signal generator 31.

At the end transmitter 11, the receiver 24 only receives the signal of 2413.4 kilocycles radiated from the transmitter 12 through operation of the signal generator 31 with the result that no beat frequency signal is produced at the output terminals thereof. Consequently, no signal is passed by the band pass filter 26 to the rectifier and switch operator circuit 27. As a consequence, the rectifier and switch operator circuit 27 assumes a condition wherein a blocking voltage of relatively high magnitude is impressed upon the switching conductor 27a to block the receiver 25 against signal transmission therethrough and to block the gate circuit 28 against signal transmission therethrough. In this condition, the rectifier and switch operator circuit also removes a blocking voltage from the switch conductor 27b, thereby to initiate operation of the signal generator 29. Thus, when operation of the signal generator 19 is stopped and operation of the signal generator 18 is started at the center transmitter 10, the rectifier and switch operator circuit 27 functions to block the receiver 25 and the gate circuit 28 against signal transmission therethrough and to initiate operation of the signal generator 29. This generator impresses a signal voltage upon the linear mixer 22 which is mixed with the output voltage from the signal generator 21 without development of inter-modulation components therebetween and these two signal voltages are amplified through the linear final amplifier 23 and impressed upon the antenna circuit embodying the antenna 30 for radiation.

At the end transmitter 12, the 2196 kilocycle signal developed by the signal generator 18 and radiated from the center transmitter 10 by the antenna 17 is passed by the receiver 34 along with the 2195.76 kilocycle signal developed by the signal generator 21 and radiated by the antenna 30. As a consequence, a 240 cycle beat frequency signal is developed at the output terminals of the receiver 34 which is selectively passed by the band pass filter 36 and impressed upon the input terminals of the rectifier and switch operator circuit 37 and also upon one of the two sets of signal input terminals of the gate circuit 39. The rectifier and switch operator circuit 37 responds to this applied signal voltage by impressing a relatively high negative blocking voltage to the switching conductor 37b which has the effect of biasing the signal generator 38 to prevent continued operation. As a consequence, this signal generator stops operating to effect radiation of a signal having the frequency of 2299.58 kilocycles from the antenna 40 of the end transmitter 12. Application of the 240 cycle beat frequency signal to the input terminal of the rectifier and switch operator circuit 37 also causes this component to remove the negative blocking voltage from the switching conductor 37a with the result that the receiver 35 and the gate circuit 39 are both unblocked to permit signal transmission therethrough. As a consequence, the 240 cycle beat frequency signal passed by the band pass filter 36 is transmitted through the gate circuit 29 and impressed upon the amplitude modulator 31a for modulation upon the 2413.4 kilocycle signal generated by the signal generator 31.

At the end transmitter 12, the 2300 kilocycle signal developed by the signal generator 14 and radiated by the antenna 17 of the center transmitter 10 is heterodyned with the 2299.58 kilocycle signal developed by the signal generator 29 and radiated by the antenna 30 of the end transmitter 11 in the receiver 35 to produce a 420 cycle beat frequency signal at the output side of this receiver. This beat frequency signal is selectively passed by the 420 cycle band pass filter 35a, transmitted through the gate circuit 39, and impressed upon the modulation terminals of the amplitude modulator 31a for modulation upon the signal produced by the signal generator 31 along with the 240 cycle beat frequency signal impressed upon these terminals through the filter 36 and the gate circuit 39. Thus the 2413.4 kilocycle signal developed by the signal generator 31 is amplitude modulated by the amplitude modulator 31a with the two described beat frequency signals, which for convenience, may be referred to as reference signals, having frequencies of 240 cycles and 420 cycles, respectively. This amplitude modulated signal is transmitted through the linear mixer 32, amplified through the linear final amplifier 33 and impressed upon the antenna circuit embodying the antenna 40 for radiation from the end transmitter 12.

Summarizing the above description, it will be understood that when the signal generator 18 is effective to produce signal radiation from the center transmitter 10 and the signal generator 19 is ineffective to produce signal radiation from this transmitter, two high frequency signals having frequencies of 2196 kilocycles and 2300 kilocycles, respectively, are radiated from the center transmitter 10, two unmodulated high frequency signals having frequencies of 2195.76 kilocycles and 2299.58 kilocycles are radiated from the transmitter 11, and a single high frequency signal of 2413.4 kilocycles modulated with beat frequency reference signals of 240 cycles and 420 cycles is radiated from the end transmitter 12.

As indicated above, during each intervening half period of each system operating cycle, the switching unit 20 functions to cut off signal radiation by the signal generator 18 and to effect radiation of the signal developed by the signal generator 19 along with the signal continuously produced and radiated from the transmitter 10 by the signal generator 14. Thus, when the switching unit changes its condition or setting to block signal transmission therethrough from the generator 18 and to permit signal transmission therethrough from the generator 19, the 2414 kilocycle signal developed by the last mentioned generator is mixed in the linear mixer 15 with the signal produced by the 2300 kilocycle generator 14 without the development of inter-modulation components therebetween, and the two signals are amplified through the linear final amplifier 16 and impressed upon the antenna circuit embodying the antenna 17 for radiation from the transmitter 10. When this occurs, the receiver 34 provided at the end transmitter 12 only receives the signal of 2195.76 kilocycles being developed by the signal generator 21 and radiated from the transmitter 11. Accordingly, the 240 cycle beat frequency signal developed at the output terminals of the receiver 34 disappears, with the result that the rectifier and switch operator circuit 37 changes its condition or setting to apply a high negative blocking potential to the switching conductor 37a and to remove the negative blocking potential from the switching conductor 37b. In response to this operation, the receiver 35 and the gate circuit 39 are instantly blocked against further signal transmission therethrough. Removal of the negative blocking potential from the switching conductor 37b has the effect of initiating operation of the 2299.58 kilocycle signal generator 38 with the result that the output signal from this generator is mixed with the now unmodulated output signal of the signal generator 31 in the linear mixer 32, and the two signals are amplified through the linear final amplifier 33 and impressed upon the antenna circuit embodying the antenna 40 for radiation from the transmitter 12. It will thus be understood that when the switching unit 20 operates to block the 2196 kilocycle signal generator 18 against signal radiation from the center transmitter 10, the rectifier and switch operator circuit 37 instantly functions to block the receiver 35 and the gate circuit 39 against signal transmission therethrough, with the result that transmission of the above described beat frequency reference signals from the end transmitter 12 is discontinued.

At the end transmitter 11, the 2414 kilocycle signal being radiated from the center transmitter 10 and the 2413.4 kilocycle signal being radiated from the end transmitter 12 are received and heterodyned by the receiver 24 to produce a beat frequency output signal having a frequency of 600 cycles. This beat frequency signal is selectively passed by the band pass filter 26 and impressed upon the input terminals of the rectifier and switch operator circuit 27 and one set of signal input terminals of the gate circuit 28. The rectifier and switch operator circuit 27 responds to the applied 600 cycle beat frequency signal by removing the negative blocking potential from the switching conductor 27a and impressing a high negative blocking potential upon the switching conductor 27b. As a consequence of the latter operation, the 2299.58 kilocycle signal generator 29 is instantly cut off to discontinue radiation of a signal of the indicated frequency from the end transmitter 11. Removal of the blocking potential from the switching conductor 27a has the effect of unblocking the receiver 25 and the gate circuit 28 to permit signal transmission therethrough. As a consequence, the 600 cycle beat frequency signal appearing at the output terminals of the filter 26 is passed through the gate circuit 28 and impressed upon the modulation terminals of the amplitude modulator 21a. When the receiver 25 is unblocked for signal transmission therethrough in the manner just described, this receiver receives and heterodynes the 2300 kilocycle signal being radiated from the center transmitter 10 with the 2299.58 kilocycle signal being radiated from the end transmitter 12 to produce a beat frequency signal of 420 cycles at its output terminals which is selectively passed by the band pass filter 25a, transmitted through the gate circuit 28, and impressed upon the modulation terminals of the amplitude modulator 21a along with the 600 cycle beat frequency signal applied to these terminals through the filter 26 and the gate circuit 28. As a consequence of the described operations, the 2195.76 kilocycle output signal of the signal generator 21 is amplitude modulated simultaneously with beat frequency reference signals having frequencies of 420 cycles and 600 cycles, respectively. This amplitude modulated signal is passed through the linear mixer 22, amplified through the linear final amplifier 23, and impressed upon the antenna circuit embodying the antenna 30 for radiation from the transmitter 11.

To summarize the above description with reference to system cycle periods when the signal generator 18 is ineffective and the signal generator 19 is effective to produce signal radiation from the center transmitter 10, it is pointed out that during each such period two signals having frequencies of 2300 kilocycles and 2414 kilocycles are radiated from the center transmitter 10, two high frequency signals having frequencies of 2299.58 kilocycles and 2413.4 kilocycles are radiated from the antenna 40 of the end transmitter 12, and a single high frequency signal of 2195.76 kilocycles modulated with two beat frequency reference signals having frequencies of 420 cycles and 600 cycles, respectively, is radiated from the antenna 30 of the transmitter 11.

Referring now more particularly to operation of the mobile craft receiver 13, it will be understood that all signals radiated from the antennas 17, 30 and 40 of the transmitters 10, 11 and 12 are collected by a single receiving antenna circuit which embodies the antenna 41. During periods when the signal generator 19 is operating, the 2300 kilocycle and 2299.58 kilocycle signals respectively radiated from the transmitters 10 and 12 are accepted by the receiver 43 and heterodyned by this receiver to produce a beat frequency signal having a frequency of 420 cycles which is impressed upon one set of input terminals of each of the two mixers 55 and 57. The 2414 kilocycle and 2413.4 kilocycle signals respectively radiated from the transmitters 10 and 12 are accepted by and heterodyned in the receiver 44 to produce a 600 cycle beat frequency signal at its output terminals which is impressed upon the input terminals of the band pass filters 47 and 50 and upon the input terminals of the mixer 63. This heterodyne signal is passed by the filter 47 and is impressed upon one set of input terminals of the phase meter 46 and upon a second set of input terminals of the mixer 55. The described heterodyne signal, is, of course, rejected by the filter 50.

With the oscillator 19 connected to the linear mixer 15 through the switching unit 20, 420 cycle and 600 cycle reference signals are modulated upon the 2195.76 kilocycle carrier wave radiated from the transmitter 11. This modulated carrier is accepted by the receiver 42 which functions to reproduce the two beat frequency reference signals at the output terminals thereof. These signals are impressed upon the input terminals of the band pass filters 45 and 48 and upon the input terminals of the mixer 56 in an obvious manner. Both beat frequency signals are rejected by the 240 cycle band pass filter 48. However, the 600 cycle reference signal is passed by the filter 45 and impressed upon the left hand set of input terminals of the phase meter 46.

For reasons which will be apparent to those skilled in the art, particularly by reference to the above identified Honore patent, the phase relationship between the two signals developed at the output terminals of the filters 45 and 47, as measured by the phase meter 46, is an index of the position of the receiving antenna 41 relative to two adjacent and closely spaced hyperbolic iso-phase lines having the antennas 17 and 40 respectively provided at the transmitters 10 and 12 as foci. More specifically, the spacing between the iso-phase lines along the base line connecting the two antennas 17 and 40 is equal to one-half the wave length of the mean or average of the 2414 kilocycle and the 2413.4 kilocycle signals radiated from the transmitters 10 and 12. At points removed from the base line, the iso-phase lines, of course, diverge and are somewhat more widely spaced. However, since one-half wave length of a signal having a frequency of approximately 2414 kilocycles is equal to about 204 feet and the phase meter 46 measures and indicates a 360° phase shift during movement of the antenna 41 across one lane, i. e., a distance equal to the spacing between two adjacent iso-phase lines, it will be understood that the phase meter 46 provides a fine or narrow lane position indication.

To obtain the coarse or wide lane position indication, the 600 cycle heterodyne signal developed at the output terminals of the filter 47 is mixed with the 420 cycle heterodyne signal developed at the output terminals of the receiver 43 in the mixer 55 to produce a 180 cycle double heterodyne signal which is passed by the filter 54 and impressed upon the right hand set of input terminals of the phase meter 53. To the same end, the 420 cycle and 600 cycle reference signals developed at the output terminals of the receiver 42 are heterodyned by the mixer 56 to produce a second double heterodyne signal of 180 cycles which is passed by the filter 52 and impressed upon the left hand set of input terminals of the phase meter 53. Thus the two double heterodyne signals impressed upon the two sets of input terminals of the phase meter 53 are phase compared by this meter to produce an indication of the phase relationship therebetween. For reasons which will be apparent from an understanding of the difference frequency principle as fully disclosed in United States Patent No. 2,652,558 granted September 15, 1953 to James E. Hawkins and assigned to the same assignee as the present application, it will be understood that the phase relationship between the 180 cycle double heterodyne signals applied to the input terminals of the phase meter 53 varies as a direct function of the position of the antenna 41 relative to two adjacent iso-phase lines having the antennas 17 and 40 of the two transmitters 10 and 12 as foci and having a spacing which is determined by the difference between the mean or average frequencies of the two sets of signals radiated from the two transmitters 10 and 12. More specifically, along the base line connecting the two antennas 17 and 40 this spacing is equal to one-half the wave length of a signal having a frequency of 113.91 kilocycles, a distance of approximately 4320 feet, which is approximately 21 times greater than the spacing between the iso-phase lines relative to which position indications are provided by the phase meter 46 of the fine or narrow lane position indicating facilities. The accuracy of the coarse lane position indicating facilities including the phase meter 53 is, of course, far less than that of the fine or narrow lane position indicating facilities including the phase meter 46. It has been found, however, that when the coarse or wide lane position indicating facilities operate on lane widths which are approximately 20 times greater than the width of the lanes within which the fine or narrow lane position indicating facilities operate, the accuracy of the coarse or wide lane facilities is entirely adequate to insure identification of the particular narrow lane in which fine indications are being provided by the fine or narrow lane position indicating facilities comprising the phase meter 46. To summarize, during each period when the signal generator 19 is in operation, the phase meters 46 and 53 respectively provide fine and coarse position indications relative to two sets of differently spaced hyperbolic iso-phase lines both sets of which have the antennas 17 and 40 respectively provided at the transmitters 10 and 12 as foci.

During periods when the oscillator 18 is connected to the linear mixer 15 through the switching unit 20 at the center transmitter 10, the 2300 kilocycle and 2299.58 kilocycle signals respectively radiated from the transmitters 10 and 11 as collected by the antenna 41 are received and heterodyned by the receiver 43 to produce a 420 cycle heterodyne signal which is impressed upon one set of signal input terminals of each of the two mixers 55 and 57. The 2196 kilocycle and 2195.76 kilocycle signals respectively radiated from the transmitters 10 and 11 are accepted by the receiver 42 and heterodyned therein to produce a 240 cycle heterodyne signal at the output terminals of this receiver which is impressed upon the input terminals of the filters 45 and 48 and upon the input terminals of the mixer 56. Since only this heterodyne signal is applied to the mixer 56 during this particular interval of operation of the transmitters, no double heterodyne signals are developed thereby. The 240 cycle heterodyne signal is rejected by the filter 45 but is passed by the filter 48 and impressed upon the left hand set of input terminals of the phase meter 49 and also upon one set of signal input terminals of the mixer 57. As indicated above, during periods when the signal generator 18 is operating at the center transmitter 10, the 420 cycle and 240 cycle reference signals are carried as modulation components on the 2413.4 kilocycle signal radiated from the transmitter 12. This signal is received by the receiver 44 and the two reference signals are reproduced in this receiver to appear at the output terminals thereof. Both reference signals are impressed upon the input terminals of the filters 47 and 50 and upon the input terminals of the mixer 63. They are both rejected by the 600 cycle band pass filter 47. The 240 cycle reference signal is passed by the filter 50 and impressed upon the right hand set of input terminals of the phase meter 49. The filter 50, of course, rejects the 420 cycle reference signal.

It will thus be apparent that during each period when the signal generator 18 is effective to produce signal radiation from the center transmitter 10, heterodyne and reference signals both having a frequency of 240 cycles are impressed upon the two sets of input terminals of the phase meter 49. This phase meter, in measuring the phase relationship between the two applied signals, provides an indication of the position of the receiving antenna 41 relative to two adjacent hyperbolic iso-phase lines having the antennas 17 and 30 at the transmitters 10 and 11 as foci. Along the base line connecting the two antennas 17 and 30, the spacing between adjacent iso-phase lines is equal to one-half the wave length of a signal having a frequency of 2195.88 kilocycles, which represents a spacing of 224 feet. The iso-phase lines, of course, diverge to wider spacings at points located on either side of the described base line. However, the lanes between adjacent iso-phase lines are relatively narrow so that the phase meter 49 provides a highly accurate fine or narrow lane indication of the position of the receiving antenna 41 relative to the positions of the radiating antennas 17 and 30.

Coarse or wide lane position indications are provided by facilities including the phase meter 59 in exactly the same manner as these indications are provided by the described facilities including the phase meter 53 during periods when the signal generator 19 is operating at the center transmitter 10. Thus, the 240 cycle heterodyne signal appearing at the output terminals of the filter 48 is mixed with the 420 cycle heterodyne signal appearing at the output terminals of the receiver 43 in the mixer 57 to produce a double heterodyne beat frequency signal of 180 cycles which is passed by the filter 58 and impressed upon the left hand set of input terminals of the phase meter 59. Further, the 240 cycle and 420 cycle reference signals developed at the output terminals of the receiver 44 are heterodyned by the mixer 63 to produce a double heterodyne beat frequency signal of 180 cycles which is passed by the filter 60 and applied to the right hand set of input terminals of the phase meter 59. Here again, the coarse or wide lane position indicating facilities operate in accordance with the above referred to difference frequency principle, so that the phase meter 59 provides phase indications relative to widely spaced hyperbolic iso-phase lines having the radiating antennas 17 and 30 as foci. In accordance with the difference frequency principle, the spacing between adjacent iso-phase lines along the base line connecting the antennas 17 and 30 is in this case equal to one-half the wave length of a signal having a frequency of 103.91 kilocycles, i. e., a spacing of approximately 4730 feet, which is some twenty-one times greater than spacing between the iso-phase lines of the fine grid with reference to which the phase meter 49 provides position indications. Thus, coarse or wide lane position indications are provided by the phase meter 59, the accuracy of which is sufficient to identify the particular pair of iso-phase lines relative to which the phase meter 49 is providing indications.

From the above explanation, it will be understood that as the two signal generators 18 and 19 are alternately rendered operative to effect signal radiation from the center transmitter 10, the two sets of phase meters 46, 53 and 49, 59 are alternately rendered effective to produce position indications relative to two intersecting sets of fine and coarse hyperbolic grid patterns. Thus an absolute determination of the position of the receiving antenna 41 within the area of effective reception of signals radiated from the three transmitters 10, 11 and 12 is obtained. In this regard, it is noted that the switching rate of the switching unit 20 is sufficiently high, of the order of four cycles per second, that the phase meters 46, 49, 53 and 59 tend to retain their settings during the short intervals when they are inactive, thereby effectively providing continuous position indications.

Figure 3:
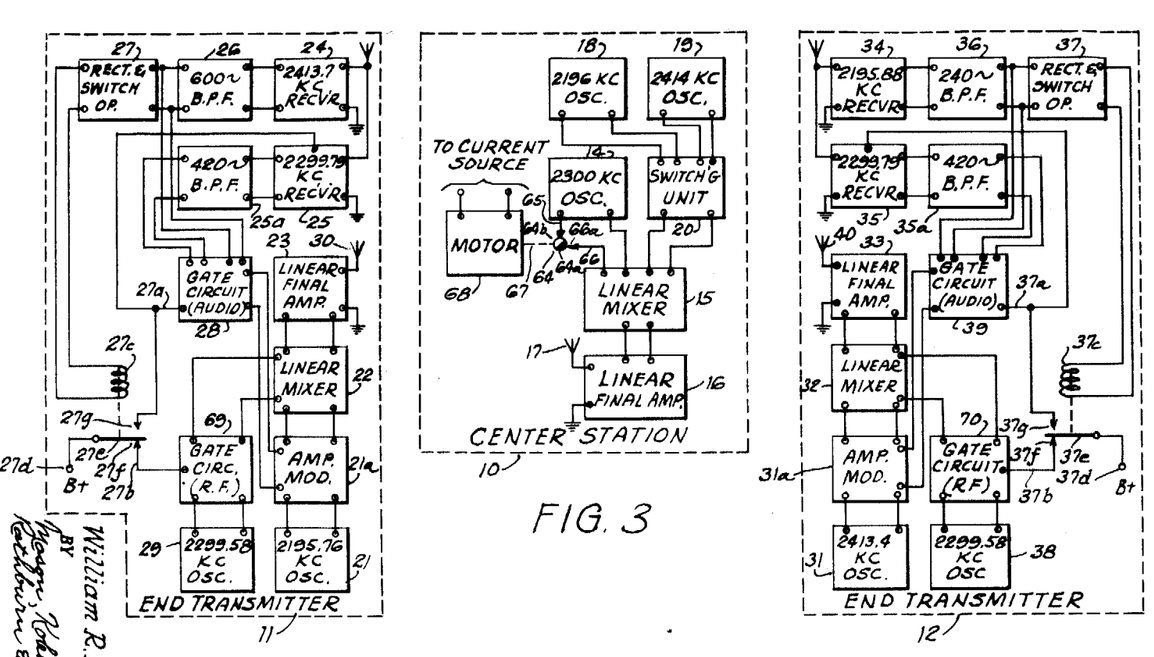
Fig. 3 diagrammatically illustrates a modified embodiment of the present improved transmission system.

Referring now to Fig. 3, there is disclosed a modified arrangement of the transmitting apparatus of the present invention which may be employed in cooperation with the receiving apparatus shown in Fig. 2 to provide both coarse and fine position indicating signals of the location of the receiving antenna 41. Since, as previously indicated, the indicating elements of the phase meters 53 and 59 included in the coarse position indicating facilities of the mobile craft receiver 13 change position upon movement of the mobile craft at a considerably slower rate than the change in position of the indicating elements of the phase meters 46 and 49 of the fine position indicating facilities for the same movement of the mobile craft, it is apparent that coarse lane information can be integrated over a considerably longer time than the fine lane information and thus, if desired, the signals providing the coarse position identifications may be periodically turned off for brief intervals of time without disturbing the accuracy of the system. Specifically, as shown in Fig. 3, the connection between the 2300 kilocycle oscillator 14 and the linear mixer 15 at the center transmitter 10 may be periodically interrupted by a switch 64 connected between the terminal conductor 65 at the output side of the oscillator 14 and the terminal conductor 66 at the input side of the linear mixer 15. The switch 64 is essentially a commutating ring comprising an insulating segment 64a and a conducting segment 64b each of which comprises approximately one-half of the periphery of the ring. A pair of spaced brushes 65a and 66a are provided in engagement with the ring periphery, the brush 65a being connected to the conductor 65 and the brush 66a being connected to the conductor 66. The switch 64 is adapted to be driven at a constant predetermined rate by a suitable constant speed motor 68 mechanically coupled to the switch as indicated by the dotted line 67. It is apparent that when either or both of the brushes 65a or 66a are in contact with the insulating segment 64a of the ring, the circuit between the oscillator 14 and the mixer 15 is broken thus preventing radiation of the 2300 kilocycle signal from the center transmitter 10. When, on the other hand, the brushes 65a and 66a are simultaneously in contact with the conducting segment 64b of the ring, an electrical circuit between the oscillator 14 and the mixer 15 is established thus initiating radiation of the 2300 kilocycle signal from the center transmitter. Since the brushes 65a and 66a are separated by approximately 90 degrees on the periphery of the commutating ring of the switch 64 it is apparent that a circuit connection between the oscillator and the mixer is established for approximately one-fourth of a complete cycle of rotation of the ring, while this circuit is broken for the other three-fourths of that cycle. Preferably, the speed of rotation of the motor 68 is such that the 2300 kilocycle signal is radiated by the center transmitter 10 for approximately one second and thereafter such radiation is terminated for approximately three seconds. It will be recalled that the switching rate for the switching unit 20 is preferably such that four complete cycles of alternate application of signals from the oscillators 18 and 19 to the mixer 15 are effected per second. Thus during the one second interval when the center transmitter 10 is operative to radiate a 2300 kilocycle signal the switching unit 20 alternately delivers four complete cycles of signals from the oscillators 18 and 19 to the mixer 15 in order to radiate additional signals at the indicated frequencies from the center transmitter.

The end transmitter 11 illustrated in Fig. 3 is similar to the end transmitter 11 shown in Fig. 1 but, in addition, includes a gate circuit 69. Also, in order to facilitate the description of the system, a relay 27c and its associated contacts, which in Fig. 1 were included within the circuitry diagrammatically represented by the rectifier and switch operator 27, have been shown separately in Fig. 3. The end transmitter 12 shown in Fig. 3 is likewise similar to the end transmitter 12 of Fig. 1 except that the former includes a radio frequency gate circuit 70 and a relay coil 37c and its associated contacts shown separately from the rectifier and switch operator 37.

Considering now the interval of operation when the center transmitter 10 is operative simultaneously to radiate both the 2300 kilocycle signal from the oscillator 14 and the 2414 kilocycle signal from the oscillator 19, it will be seen that the receiver 34 at the end transmitter 12 accepts only the 2195.76 kilocycle signal continuously radiated from the end transmitter 11 and, therefore, does not develop a signal to actuate the rectifier and switch operator 37. For this reason, the relay coil 37c remains deenergized with the result that an electrical circuit is established between the positive terminal 37d of a source of B+ potential, through the closed contacts 37e and 37f, through the signal connector 37b to the gate circuit 70. Thus, during the described interval of operation, the gate circuit 70 is in its energized or open condition and is operative to pass signals from the oscillator 38 having a frequency of 2299.58 kilocycles to the linear mixer 32. Accordingly, the end transmitter 12, in addition to the 2413.4 kilocycle signal continuously radiated also functions to radiate a 2299.58 kilocycle signal during the described interval of operation.

At the end transmitter 11, the receiver 24 heterodynes the 2414 kilocycle signal radiated from the center transmitter 10 with the 2413.4 kilocycle signal continuously radiated by the end transmitter 11 and reproduces a 600 cycle beat frequency signal which is passed by the band pass filter 26 to actuate the rectifier and switch operator 27. The signal from the rectifier and switch operator energizes the relay coil 27c thus moving the arm 27e from the normally deenergized position shown in Fig. 3 into engagement with the fixed contact 27g. An electrical circuit is thus established between the positive terminal 27d of a source of B+ potential and one or more of the electron discharge tubes in the receiver 25, with the result that this receiver is placed in operation. A circuit is also established between the positive terminal 27d of the source through the conductor 27a to the audio gate circuit 28 which functions to pass the 600 cycle signal appearing at the output side of the filter 26 to the amplitude modulator 21a. The circuit between the terminal 27d and the radio frequency gate circuit 69 is broken when the relay coil 27c is energized, with the result that the gate circuit is closed and signals cannot be applied to the mixer 22 from the oscillator 29. When the receiver 25 is placed in operation, the 2299.58 kilocycle signal radiated by the end transmitter 12 is heterodyned with the 2300 kilocycle signal radiated by the center transmitter 10 with the result that a 420 cycle beat frequency signal is reproduced at the output terminals of this receiver. This beat frequency signal is applied through the band pass filter 25a to the audio gate circuit 28 which has previously been opened through energization of the relay coil 27c. The 420 cycle signal applied to the gate circuit 28 is thus passed to the amplitude modulator 21a where it is modulated simultaneously with the 600 cycle signal passed by the gate circuit 28 upon the radio frequency signal developed by the oscillator 21. The signal output of the modulator 21a is applied through the linear mixer 22 to the linear final amplifier 23 for radiation from the single radiating antenna 30 at the end transmitter 11.

In summary, during the first interval of operation just described, the center transmitter 10 is operative to radiate a pair of carrier wave signals having frequencies of 2300 kilocycles and 2414 kilocycles, the end transmitter 12 is operative to radiate a pair of carrier wave signals having frequencies of 2413.4 kilocycles and 2299.58 kilocycles, and the end transmitter 11 is operative to radiate a signal of 2195.76 kilocycles which is simultaneously modulated with a pair of reference signals having frequencies of 420 cycles and 600 cycles. These signals are all collected at the receiving antenna 41 of the mobile craft receiver 13 where they are translated into fine and coarse position indications by the phase meters 46 and 53, respectively, in the exact manner explained above.

At the end of the above described transmitting interval, the switching unit 20 functions to apply the signals from the oscillator 18 to the mixer 15 and to terminate the application of signals from the oscillator 19 to this mixer. At this time, the switch 64 remains operative to pass signals from the oscillator 14 to the linear mixer 15 thereby effecting the radiation of both 2300 kilocycle and 2196 kilocycle signals from the single transmitting antenna 17 at the center transmitter 10.

In the absence of 2414 kilocycle signals from the center transmitter, the receiver 24 at the end transmitter 11 no longer develops a 600 cycle beat frequency at its output terminals and thus the relay coil 27c is deenergized and its movable contact 27e returns to the normally deenergized position shown in Fig. 3. As a consequence, the circuit between terminal 27d and the electron discharge tubes of the receiver 25 is broken, thus rendering this receiver inoperative. At the same time, the circuit between the positive terminal 27d and the audio gate circuit 28 is interrupted and the gate is closed. Finally the return of the movable arm 27e to its deenergized position establishes an electrical circuit between the positive terminal 27d and the radio frequency gate circuit 69 through the conductor 27b, with the result that signals from the oscillator 29 are applied to the linear mixer 22. The linear mixer 22 applies both the signal from the oscillator 29 and that from oscillator 21 to the linear amplifier 23 in order to effect radiation of both signals from the single radiating antenna 30 in the manner previously described.

At the end transmitter 12, the receiver 34 heterodynes the 2196 kilocycle signal radiated by the center transmitter 10 with the 2195.76 kilocycle signal continuously radiated by the end transmitter 11 with the result that a 240 cycle beat frequency is developed for application through the band pass filter 36 to the rectifier and switch operator circuit 37. The current output of the rectifier and switch operator circuit energizes the relay coil 37c which moves the movable contact 37e from its normally deenerized position into engagement with the fixed contact 37g. As a consequence, the circuit between the positive terminal 37d and the gate circuit 70 is broken thus closing this gate circuit to prevent the signals from being passed from the oscillator 38 to the linear mixer 32. Energization of the relay coil 37c also establishes an electrical circuit between the positive terminal 37d and at least certain of the electron discharge tubes in the receiver 35, thereby to condition the latter for operation. At the same time an electrical circuit is established from the positive terminal 37d through the contacts 37e and 37g and the conductor 37a for opening the audio gate circuit 39. With the receiver 35 in operation, the 2299.58 kilocycle signal radiated from the end transmitter 11 is heterodyned with the 2300 kilocycle signal radiated from the center transmitter 10 with the result that a 420 cycle beat frequency signal is developed for transmission through the band pass filter 35a to the signal input terminals of the audio gate circuit 39. This gate circuit functions to pass the 420 cycle signal and the 240 cycle signal from the filter 36 to the amplitude modulator 31a where both of these signals are simultaneously modulated upon the signal developed by the oscillator 31. The signal output of the amplitude modulator 31a is applied through the linear mixer 32 to the linear final amplifier 33 where it is radiated from the transmitting antenna 40.

To summarize, during the interval of operation just described, the center transmitter 10 is operative to radiate a pair of carrier waves having signals of 2196 kilocycles and 2300 kilocycles, the end transmitter 11 is operative to radiate a pair of carrier waves having frequencies of 2195.76 kilocycles and 2299.58 kilocycles, and the end transmitter 12 is operative to radiate a signal having a frequency of 2413.4 kilocycles which is simultaneously modulated with reference signals of 240 cycles and 420 cycles. At the mobile craft receiver 13, these signals are collected and separated by the receivers 42, 43 and 44 to facilitate their translation into fine and coarse position indications by the phase meters 49 and 59 in the manner previously described.

The two intervals of operation just described comprise one complete cycle of operation of the transmitting facilities radiating the fine position indicating signals and, as previously indicated, involve a total expiration of time of approximately one-fourth of a second. Since the switch 64 maintains the circuit connection between the oscillator 14 and the mixer 15 for approximately one full second, it will be apparent that the above described alternate operation of the oscillators 18 and 19 continues until four complete cycles have been completed at the end of which time the switch 64 functions to break the circuit between the oscillator 14 and the mixer 15. Since the latter circuit remains broken for the succeeding three seconds, it is evident that no 2300 kilocycle signals are radiated from the center transmitter 10 during this interval. The switching unit 20, however, continues to effect the alternate application of signals from the oscillators 18 and 19 to the mixer 15 with the result that the center transmitter 10 alternately radiates the signals from these two oscillators.

When the switching unit 20 is conditioned to deliver the signals from the oscillator 19 to the mixer 15, a carrier wave having a frequency of 2414 kilocycles will be radiated from the center transmitter 10. Both this carrier wave and the carrier wave of 2413.4 kilocycles continuously radiated from the end transmitter 12 are heterodyned by the receiver 24 at the end transmitter 11 in order to reproduce a 600 cycle beat frequency signal. This beat frequency signal is passed through the band pass filter 26 to the rectifier and switch operator circuit 27 which functions to energize the relay coil 27c, so that the movable contact 27e is transferred from the position shown in Fig. 3 to the energized position in engagement with the fixed contact 27g. As previously described, this switching operation performs three important functions in that it energizes the receiver 25, it conditions the audio gate circuit 28 to pass signals to the amplitude modulator 21a, and it closes the radio frequency gate circuit 69 in order to prevent the delivery of signals appearing at the output of the oscillator 29 to the linear mixer 22. Even though the receiver 25 is placed in operation, however, it cannot develop beat frequency signals since the center transmitter 10 is not radiating a 2300 kilocycle signal during this particular interval. When the audio gate circuit 28 is opened the 600 cycle signals passed by the band pass filter 26 are passed through the gate circuit to the amplitude modulator 21a where this signal is modulated upon the signal developed by the oscillator 21. The output of the amplitude modulator 21a is applied through the linear mixer to the linear final amplifier 23 for radiation from the radiating antenna 30.

At the end transmitter 12 neither the receiver 34 nor the receiver 35 develops a beat frequency signal since the center station at this time is radiating only a single 2414 kilocycle signal. Thus the contacts controlled by the relay coil 37c remain in their deenergized positions and the gate circuit 70 remains open so that the signals developed at the output of the oscillator 38 are delivered to the linear mixer 32. This mixer is also excited by the signal developed by the oscillator 31 and passed through the amplitude modulator 31a. As previously described, the mixer 32 passes both of these radio frequency signals to the linear final amplifier 33 where both are radiated from a single antenna 40.

To summarize briefly, during the particular interval of operation just described, the center transmitter 10 is operative to radiate a single carrier wave having a frequency of 2414 kilocycles, the end transmitter 11 is operative to radiate a single carrier wave having a frequency of 2195.76 kilocycles which is modulated with a 600 cycle reference signal and the end transmitter 12 is operative to radiate a pair of carrier waves at the frequencies indicated above.

The antenna 41 of the mobile craft receiver 13 collects all of these signals and applies the same to the input terminals of the receivers 42, 43 and 44. The receiver 42 reproduces the 600 cycle reference signal appearing on the carrier wave radiated by the end transmitter 11 and passes the same through the band pass filter 45 to the left hand set of input terminals of the phase meter 46. The receiver 44 heterodynes the carrier wave radiated by the center transmitter 10 with the 2413.4 kilocycle signal radiated by the end transmitter 12 in order to reproduce a 600 cycle beat frequency signal for application through the band pass filter 47 to the right hand set of signal input terminals of the phase meter 46 with the result that this phase meter provides a fine position indication in the manner previously described. The receiver 43 accepts the 2299.58 kilocycle signal radiated from the end transmitter 12, but since this signal is a pure unmodulated carrier wave and since, furthermore, no signals appear at the mobile craft receiver which can be heterodyned with this 2299.58 kilocycle signal in the receiver 43, no output signals are developed therefrom. As a consequence, the coarse position indicating facilities at the mobile craft receiver are both rendered ineffective to provide position indications.

At the end of the above described interval, the switching unit 20 is conditioned to prevent the delivery of a signal from the oscillator 19 to the mixer 15 and at the same time to effect the delivery of a signal from the oscillator 18 to this mixer. The switch 64, of course, remains in its open position to prevent the delivery of a signal from the oscillator 14 to the mixer 15, and, therefore, only a single carrier wave having a frequency of 2196 kilocycles is radiated from the center transmitter at this time.

When the radiation of a signal having a frequency of 2414 kilocycles by the center transmitter 10 is terminated, the receiver 24 at the end transmitter 11 no longer develops a 600 cycle beat frequency signal and thus the contacts of the relay coil 27c return to their normally deenergized position. In response to this switching operation, the receiver 25 is rendered inoperative, the audio gate circuit 28 is closed and the radio frequency gate circuit 69 is opened. When the latter gate circuit is opened, the signal developed by the oscillator 29 is passed through the gate circuit to the linear mixer 22 which functions to deliver both this signal and the signal developed by the oscillator 21 to the linear final amplifier 23. As previously indicated, both of the signals applied to the linear mixer 22 and passed to the final amplifier 23 are radiated from the single radiating antenna 30.

At the end transmitter 12, the receiver 34 heterodynes the 2196 kilocycle signal radiated from the center transmitter 10 with the 2195.76 kilocycle signal continuously radiated by the end transmitter 11 in order to develop at its output terminals a 240 cycle beat frequency signal. The latter signal is passed through the band pass filter 36 to the rectifier and switch operator circuit 37, thereby to energize the relay coil 37c. Energization of this coil places the receiver 35 in operation, opens the audio gate circuit 39 and closes the radio frequency gate circuit 70. When the latter gate circuit is closed the signal from the oscillator 38 is no longer delivered to the mixer 32, with the result that a single carrier wave signal from the oscillator 31 having a frequency of 2413.4 kilocycles is applied to this mixer. Energization of the receiver 35 has no effect on the operation of the equipment at the end transmitter 12 since this receiver is incapable of developing a beat frequency signal at its output terminals in the absence of the 2300 kilocycle signal from the center transmitter 10. When the audio gate circuit 39 is opened, however, the 240 cycle signal passed by the band pass filter 36 is applied through the gate circuit to the amplitude modulator 31a for modulation as a reference signal upon the signal developed by the oscillator 31. This modulated carrier wave signal is applied to the linear mixer 32 and thence to the linear final amplifier 33 for radiation from the radiating antenna 40.

To summarize briefly, during the particular interval of operation described, the center transmitter 10 is operative to radiate a single carrier wave having a frequency of 2196 kilocycles, the end transmitter 11 radiates a pair of carrier waves at the indicated frequencies, and the end transmitter 12 radiates a single carrier wave having a frequency of 2413.4 kilocycles which is modulated with a 240 cycle reference signal. All of these signals are collected by the receiving antenna 41 at the mobile craft receiver 13 and are applied to the input terminals of the receivers 42, 43 and 44. The receiver 44 responds to the modulated carrier wave radiated by the end transmitter 12 by reproducing the 240 cycle reference signal thereon. This signal is passed through the band pass filter 50 to the right hand set of input terminals of the phase meter 49. The receiver 42 heterodynes the carrier wave radiated by the center transmitter 10 with the 2195.76 kilocycle signal radiated by the end transmitter 11 and reproduces a 240 cycle beat frequency signal at its output terminals. This signal is passed by the band pass filter 48 to the left hand set of input terminals of the phase meter 49 which functions to provide an indication representative of the fine lane position of the receiving antenna 41 in the manner described above. The receiver 43 is incapable of developing signals which disturb the operation of the mobile craft receiver since this receiver accepts only a single unmodulated carrier wave having a frequency of 2299.58 kilocycles radiated from the end transmitter 11. Thus the coarse position indicating facilities including the phase meters 53 and 59 are not actuated during this interval of operation.

The switching unit 20 at the center transmitter 10 continues to effect the alternate delivery of signals from the oscillators 18 and 19 to the linear mixer 15 during the entire time when the switch 64 is positioned to prevent delivery of signals from the oscillator 14 to the mixer 15. After the switch 64 has remained open for a total interval of approximately three seconds, the motor 68 functions to drive the switch 64 to its closed position at which time the signals from the oscillator 14 are again applied to the linear mixer 15 with the results described above.

From the foregoing explanation, it will be apparent that the transmitting system shown in Fig. 3 alternately provides position indicating and reference signals which are translated at the mobile craft receiver 13 first into a fine position indication representative of the location of the receiving antenna 41 with respect to closely spaced hyperbolic iso-phase lines having their foci at the radiating antennas 17 and 30 of the transmitters 10 and 11, respectively, and next into a fine position indication representative of the location of the receiving antenna relative to closely spaced hyperbolic iso-phase lines having their foci at the radiating antennas 17 and 40 of the transmitters 10 and 12, respectively. It will be apparent that either one or the other of these two sets of position indicating and reference signals is continuously available at the mobile craft receiver. During certain and somewhat longer periods of operation, the transmitting system shown in Fig. 3 functions to radiate to the mobile craft receiver coarse position indicating and reference signals which may be translated into indications representative of the position of the receiving antenna 41 with respect to widely spaced hyperbolic iso-phase lines having foci first located at the antennas 17 and 30 and next at the antennas 17 and 40. The coarse position indicating signals are available at the mobile craft receiver for only a portion of the entire cycle of operation of the transmitting system, but the indicating elements of the phase meters 53 and 59 on which the coarse position indications appear change their positions so slowly that the coarse lane information may be integrated between the portions of the cycle when these coarse position indicating signals are radiated.

Figure 4:
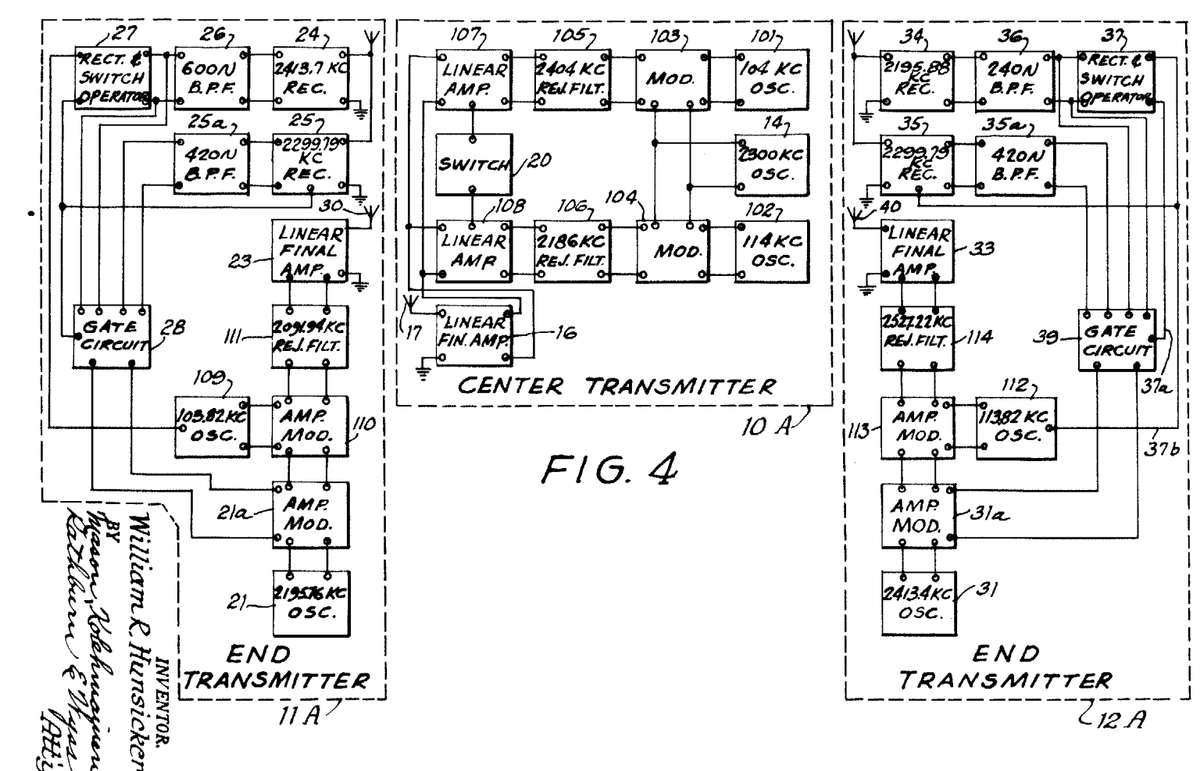
Fig. 4 diagrammatically illustrates still another embodiment of the present improved signal transmission system.

An alternative arrangement of the transmitting apparatus of the present invention which may be used in cooperation with the mobile craft receiver shown in Fig. 2 is illustrated in Fig. 4 wherein there is shown a center transmitter 10A spaced at relatively large and approximately equal distances from a pair of end transmitters 11A and 12A. The transmitters 10A, 11A and 12A are somewhat similar to the transmitters 10, 11 and 12 of the transmitting system shown in Fig. 1 and since these two systems include a number of common component elements such elements have been assigned the same reference characters. Those elements of the transmitting system of Fig. 4 which do not correspond to elements shown in Fig. 1 have been assigned reference characters in the one hundred series in order to distinguish clearly between the two systems. Thus, for example, the equipment provided at the center transmitter 10A comprises an oscillator 14 developing output signals having a frequency of 2300 kilocycles and a pair of oscillators 101 and 102 which develop output signals having frequencies of 104 kilocycles and 114 kilocycles, respectively, a pair of modulators 103 and 104 for developing sum and difference frequencies from the input signals applied thereto, a pair of frequency selective rejection filters 105 and 106 for eliminating undesired frequencies developed by the modulators, a pair of linear amplifiers 107 and 108, a switching unit 20 for alternately impressing the signals passed by the rejection filters 105 and 106 upon the input terminals of a linear final amplifier 16 through which the signals passed by the linear amplifiers 107 and 108 are alternately impressed upon the transmitter antenna circuit including the radiating antenna 17. The equipment provided at the end transmitter 11A differs from that at the end transmitter 11, previously described, only by the replacement of the oscillator 29 and the linear mixer 22 of the latter transmitter with an oscillator 109 developing signals of 103.82 kilocycles, an amplitude modulator 110 and a frequency selective rejection filter 111. In similar manner, the end transmitter 12A includes the same elements as the end transmitter 12, previously described, except that the oscillator 38 and the linear mixer 32 of the latter transmitter have been replaced by an oscillator 112 developing signals having a frequency of 113.82 kilocycles, an amplitude modulator 113 and a frequency selective rejection circuit 114.

Referring now to the operation of the system shown in Fig. 4, it can be seen that the oscillator 14 functions continuously to apply an input signal simultaneously to the modulators 103 and 104. The modulator 103 is also energized by the signal developed by the oscillator 101 with the result that the output of this modulator comprises the two input signals and the sum and difference frequencies therebetween which are developed by the modulator. Specifically, there appear at the output terminals of the modulator signals having frequencies of 104 kilocycles, 2300 kilocycles, 2404 kilocycles and 2196 kilocycles. All four of these signals are applied to the input terminals of the rejection filter 105 which is tuned to reject the signals having a frequency of 2404 kilocycles and to pass all of the other signals developed by the modulator 103 to the linear amplifier 107. If desired, a filter may also be provided to reject the 104 kilocycle signal from the oscillator 101 passed by the modulator 103, or, alternatively the linear amplifier 107 may be designed having frequency response characteristics which effectively prevent the amplification of the 104 kilocycle signal. In any event, when the switch 20 energizes the amplifier 107, the latter passes a pair of radio frequency signals having frequencies of 2196 kilocycles and 2300 kilocycles to the linear final amplifier 16 which effects the radiation of both of these signals from the single radiating antenna 17. The modulator 104, in addition to the 2300 kilocycle signal from the oscillator 14, previously mentioned, has applied thereto the 114 kilocycle signal developed by the oscillator 102 with the result that this modulator develops at its output terminals the two signals applied to its input terminals and the sum and difference frequencies therebetween. Thus at the output of the modulator 104 there appear four signals having frequencies of 114 kilocycles, 2186 kilocycles, 2300 kilocycles and 2414 kilocycles. These four signals are applied to the rejection filter 106 which eliminates the 2186 kilocycle signal and passes the other three signals to the linear amplifier 108. The 114 kilocycle signal may be eliminated by a second rejection filter or by the design of the amplifier 108 in the manner previously described so that when the switching unit 20 energizes the amplifier 108, a pair of signals having frequencies of 2300 kilocycles and 2414 kilocycles are applied to the linear final amplifier 16 for radiation from the single radiating antenna 17. Preferably the switching rate of the unit 20 is again such that the operating cycle of the system consumes approximately one-fourth of a second with the periods during which the signals are alternately applied to the final amplifier from the linear amplifiers 107 and 108 being equally divided during the operating cycle. As previously indicated, during each half cycle when the switching unit 20 is conditioned to pass a pair of signals from the linear amplifier 107 to the linear final amplifier 16, both of these signals are impressed upon the antenna circuit, including the antenna 17, without the introduction of inter-modulation components therebetween, due to the linear transmission characteristics of the signal channel including the linear amplifier 107 and the linear final amplifier 16. The same holds true for the period when the switching unit 20 is conditioned to apply the signals from the linear amplifier 108 to the linear final amplifier 16. In summary, the center transmitter 10A is alternately operated to radiate first a pair of signals having frequencies of 2300 kilocycles and 2196 kilocycles and next a pair of signals having frequencies of 2300 kilocycles and 2414 kilocycles. In effect, this operation provides for the continuous radiation of a 2300 kilocycle signal from the center transmitter 10A and the alternate radiation of 2196 kilocycle and 2414 kilocycle signals from that transmitter. Thus the center transmitter 10A shown in Fig. 4 performs identically the same functions and radiates exactly the same signals as the center transmitter 10 previously described in conjunction with the transmitting system shown in Fig. 1.

With the switching unit 20 conditioned to deliver signals from the linear amplifier 107 to the linear final amplifier 16, the receiver 34 at the end transmitter 12 heterodynes the 2196 kilocycle signal radiated from the center transmitter with the 2195.76 kilocycle signal continuously radiated from the end transmitter 11A and reproduces a 240 cycle beat frequency signal at its output terminals. This beat frequency signal is passed by the band pass filter 36 and energizes the rectifier and switch operator circuit 37 with the result that the oscillator 112 is rendered inoperative, the receiver 35 is rendered operative and the gate circuit 39 is opened. With the receiver 35 in operation, the 2300 kilocycle signal radiated by the center transmitter 10A is heterodyned with the 2299.58 kilocycle signal radiated by the end transmitter 11A in order to reproduce a 420 cycle beat frequency signal, which signal is passed through the band pass filter 35a and through the gate circuit 39 to the amplitude modulator 31a. The gate circuit 39 also applies the 240 cycle signal passed by the filter 36 to the amplitude modulator 31a in order to effect the simultaneous modulation of both of the 240 cycle and the 420 cycle signals upon the radio frequency signal developed by the oscillator 31. The signal appearing at the output terminals of the amplitude modulator 31a is passed by both the modulator 113 and the filter 114 to the linear amplifier 33 where it is transmitted from the radiating antenna 40 to the mobile craft receiver.

At the end transmitter 11A, the receiver 24 develops no heterodyne or beat frequency signals during this particular interval and thus the rectifier and switch operator circuit 27 is not operated. Under these conditions, the receiver 25 is maintained inoperative, the gate circuit 28 is closed and the oscillator 109 is in operative condition. The oscillator 109 applies a signal of 103.82 kilocycles to the amplitude modulator 110 which also has applied thereto the 2195.76 kilocycle signal developed by the continuously operative oscillator 21. The amplitude modulator 110 reproduces at its output terminals the two signals applied to its input terminals, together with the sum and difference frequencies therebetween. Specifically, there appear at the output of the amplitude modulator 110 carrier waves having frequencies of 103.82 kilocycles, 2091.94 kilocycles, 2195.76 kilocycles and 2299.58 kilocycles. These four signals are all applied to the input terminals of the rejection filter 111 which functions to eliminate the 2091.94 kilocycle difference frequency signal and to apply the remaining signals to the final amplifier 23. The 103.82 kilocycle signal may be eliminated in the final amplifier by a suitable filter thus insuring that the final amplifier will deliver only the 2195.76 kilocycle signal and the 2299.58 kilocycle signal for simultaneous radiation from the signal radiating antenna 30.

In summary, during the interval of operation just described, the center transmitter 10A is operative to radiate a pair of carrier wave signals having frequencies of 2196 and 2300 kilocycles, the end transmitter 11A is operative to radiate a pair of carrier wave signals having frequencies of 2195.76 kilocycles and 2299.58 kilocycles and the end transmitter 12A is operative to radiate a carrier wave signal having a frequency of 2413.4 kilocycles which is simultaneously modulated with reference signals of 240 cycles and 420 cycles. At the mobile craft receiver 13 these signals are translated into fine and coarse position indications by the phase meters 49 and 59 in the manner previously described.

At the end of the above described transmitting interval, the switching unit 20 functions to deenergize the linear amplifier 107 and at the same time to place the linear amplifier 108 in operation. As a result the 2300 kilocycle signal and the 2414 kilocycle signal passed by the filter 105 are both applied to the linear final amplifier 16 for simultaneous radiation from the antenna 17. At the end transmitter 12A, the receiver 34 no longer reproduces a 240 cycle beat frequency signal and thus the rectifier and switch operator circuit 37 is not actuated with the result that the gate circuit 39 is closed, the receiver 35 is rendered inoperative and the oscillator 112 is placed in operation. This oscillator applies a signal of 113.82 kilocycles to the amplitude modulator 113 simultaneously with the application thereto of the 2413.4 kilocycle signal continuously developed by the oscillator 31. The modulator 113 reproduces both of the signals applied to its separate sets of input terminals, as well as the sum and difference frequencies between these signals, thus developing, at its output terminals, four signals having frequencies of 113.82 kilocycles, 2299.58 kilocycles, 2413.4 kilocycles and 2527.22 kilocycles. All four of these signals are applied to the rejection filter 114 which eliminates the signal having a frequency of 2527.22 kilocycles and passes all of the other signals to the final amplifier 33. The latter circuit may include a filter for eliminating the 113.82 kilocycle signal thus insuring that only the 2413.4 and 2299.58 kilocycle signals will be simultaneously radiated from the antenna 40.

At the end transmitter 11A, the receiver 24 heterodynes the 2414 kilocycle signal radiated from the center transmitter 10A with the 2413.4 kilocycle signal radiated from the end transmitter 12A, with the result that a 600 cycle beat frequency signal is reproduced at its output terminals. This beat frequency signal is passed by the band pass filter 26 to energize the rectifier and switch operator circuit 27, whereupon the receiver 25 is placed in operation, the gate circuit 28 is opened and the oscillator 109 is rendered inoperative. The receiver 25 then heterodynes the 2300 kilocycle signal radiated by the center transmitter 10A with the 2299.58 kilocycle signal continuously radiated from the end transmitter 12A in order to develop a 420 cycle signal for application through the band pass filter 25a and through the gate circuit 28 to the amplitude modulator 21a. The gate circuit 28 also passes the 240 cycle beat frequency signal appearing at the output terminals of the band pass filter 26 to the amplitude modulator 21a, with the result that the signal developed by the oscillator 21 is simultaneously modulated with a pair of reference signals having frequencies of 420 cycles and 600 cycles. The modulated radio frequency signal developed by the amplitude modulator 21a is passed through the amplitude modulator 110 and the reject filter 111 to the linear amplifier 23 where it is radiated from the antenna 30. To summarize briefly, during the above described transmitting interval the center transmitter 10A is operative to radiate a pair of carrier waves having frequencies of 2300 kilocycles and 2414 kilocycles, and the end transmitter 12A is operative to radiate a pair of carrier waves having frequencies of 2299.58 kilocycles and 2413.4 kilocycles and the end transmitter 11A is operative to radiate a single carrier wave having a frequency of 2195.76 kilocycles which is simultaneously modulated with reference signals of 420 cycles and 600 cycles. All of these signals are collected at the mobile craft receiver 13 and are translated into fine and coarse position indications by the phase meters 46 and 53 in the manner described above.

From the foregoing explanation, it will be apparent that the present invention affords a satisfactory solution to the problem of radiating a plurality of signals from the same radiating antenna without generating undesirable inter-modulation or side band components. Furthermore, this problem has been solved in a simple, economical and reliable manner by the use of inexpensive equipment which does not require accurately designed, expensive elements such as high cost filters and the like. Moreover, the radiation of a plurality of signals from the same transmitting point by the system of the present invention provides a system which employs a minimum number of channel frequencies and yet provides non-ambiguous position indications of improved accuracy to any number of system users.

While several embodiments of the invention have been shown, it will be understood, of course, that the invention is not limited thereto since many other modifications may be made and it is therefore contemplated by the appended claims to cover any such modifications as fall within the true spirit and scope of the invention.

What is claimed as new and desired to be secured by Letters Patent of the United States is:

1. A wave signal transmission system comprising a pair of spaced transmitters each continuously radiating a signal of different frequency, a transmitting unit spaced from each of said transmitters and including means for alternately radiating first and second carrier waves, means at said transmitting unit for intermittently radiating a third carrier wave, means associated with said pair of transmitters for effecting the alternate radiation of an additional signal from each of said transmitters during the respective intervals when the transmitting unit is radiating said first and second carrier waves, means at each of said pair of transmitters respectively responsive to said first and second carrier waves for alternately modulating the signal continuously radiated from each transmitter with reference signals, and means at each of said transmitters responsive to said third carrier wave for intermittently modulating the signal continuously radiated from each transmitter with other reference signals.

2. A wave signal transmission system comprising a pair of spaced transmitters each continuously radiating a signal of different frequency, a transmitting unit spaced from each of said transmitters and including means for alternately radiating first and second carrier waves, means at said transmitting unit for intermittently radiating a third carrier wave, means associated with the first of said transmitters for effecting radiation of an additional signal from said first transmitter only when the transmitting unit is radiating said first carrier wave, means associated with the second of said transmitters for effecting radiation of another signal from said second transmitter only when the transmitting unit is radiating said second carrier wave, means at said first and second transmitters respectively for periodically modulating the signal continuously radiated from each transmitter with reference signals, and means at each of said transmitters responsive to said third carrier wave for intermittently modulating the signal continuously radiating from each transmitter with other reference signals.

3. A wave signal transmission system comprising a pair of spaced transmitters each continuously radiating a signal of different frequency, a transmitting unit spaced from each of said transmitters and including means for alternately radiating first and second carrier waves, means at said transmitting unit for intermittently radiating a third carrier wave, means associated with the first of said transmitters and jointly responsive to said second carrier wave and to the signal continuously radiated by said second transmitter for effecting radiation of an additional signal from said first transmitter only when the transmitting unit is radiating said first carrier wave, means associated with the second of said transmitters and jointly responsive to said first carrier wave and to the signal continuously radiated by said first transmitter for effecting radiation of another signal from said second transmitter only when the transmitting unit is radiating said second carrier wave, means at said first and second transmitters respectively responsive to said first and second carrier waves for alternately modulating the signal continuously radiated from each transmitter with reference signals, and means at each of said transmitters each responsive to said third carrier wave for intermittently modulating the signal continuously radiated from each transmitter with other reference signals.

4. A wave signal transmission system comprising first and second transmitters for respectively radiating continuously first and second signals having different frequencies, means for rendering said transmitters alternately operative to radiate additional signals of the same frequency but differing from the frequencies of said first and second signals, a transmitting unit spaced from each of said transmitters and including means for alternately radiating first and second carrier waves, means at said transmitting unit for intermittently radiating a third carrier wave, a pair of heterodyning means associated with each of said transmitters respectively responsive at least in part to said third carrier wave and to one of said first and second carrier waves for reproducing reference signals of different frequency and for periodically modulating the signal continuously radiated from its associated transmitter with said reference signals.

5. A wave signal transmission system comprising first and second transmitters for respectively radiating continuously first and second signals having different frequencies, means for rendering said transmitters alternately operative to radiate additional signals of the same frequency but differing from the frequencies of said first and second signals, a transmitting unit spaced from each of said transmitters and including means for alternately radiating first and second carrier waves, means at said transmitting unit for intermittently radiating a third carrier wave, means at said transmitters respectively responsive to said first and second carrier waves for periodically modulating the signal continuously radiated from each transmitter with reference signals, and means at each of said transmitters responsive to said third carrier wave for intermittently modulating the signal continuously radiated from each transmitter with other reference signals.

6. A wave signal transmission system comprising first and second transmitters for respectively radiating continuously first and second signals having different frequencies, means for rendering said transmitters alternately operative to radiate additional signals of the same frequency but differing from the frequencies of said first and second signals, a transmitting unit spaced from each of said transmitters and including means for alternately radiating first and second carrier waves, means at said transmitting unit for intermittently radiating a third carrier wave, heterodyning means at said first transmitter jointly responsive to said first carrier wave and to said second signal for developing a first reference signal and for periodically modulating the signal continuously radiated from said first transmitter with said first reference signal, heterodyning means at said second transmitter jointly responsive to said second carrier wave and to said first signal for developing a second reference signal and for periodically modulating the signal continuously radiated from said second transmitter with said second reference signal, and heterodyning means associated with each of said transmitters each jointly responsive to said third carrier wave and to the additional signal radiated from the other transmitter for developing an additional reference signal and for intermittently modulating the signal continuously radiated from its associated transmitter with said additional reference signal.

7. A wave signal transmission system comprising at least three spaced transmitting units for radiating at least seven distinguishable carrier waves having different frequencies, means at a first and second of said units for respectively radiating continuously a first and second of said waves, means at the third of said units for alternately radiating a third and fourth of said waves, means at the first and second of said units for rendering said units alternately operative to radiate a fifth and sixth of said waves during the respective intervals when said third unit alternately radiates said third and fourth waves, means at said third unit for radiating a seventh of said waves, and means for periodically rendering said last named means operative during spaced intervals having a duration covering at least one complete cycle of alternate radiation of said third and fourth waves by said third unit.

8. A wave signal transmission system comprising at least three spaced transmitting units for radiating at least seven distinguishable carrier waves having different frequencies, means at a first and second of said units for respectively radiating continuously a first and second of said waves, means at the third of said units for alternately radiating a third and fourth of said waves, means at the first and second of said units each selectively responsive to a different one of said third and fourth waves for rendering said units alternately operative to radiate a fifth and sixth of said waves during the respective intervals when said third unit alternately radiates said third and fourth waves, means at said third unit for radiating a seventh of said waves, means for intermittently rendering said last named means operative during spaced intervals having a duration covering at least one complete cycle of alternate radiation of said third and fourth waves by said third unit, a pair of heterodyning means associated with each of said first and second units respectively responsive at least in part to the seventh wave intermittently radiated by said third unit and to only one of the third and fourth waves alternately radiated by said third unit for developing beat frequency signals and for modulating the wave continuously radiated from its associated transmitter with reference signals having a frequency related to said beat frequency signals.

9. A wave signal transmission system comprising at least three spaced transmitting units for radiating carrier wave signals, means for rendering a first and second of said units operative to radiate a first and second pair of carrier waves during a first interval, all said carrier waves having a different frequency and each of said first and second transmitting units radiating one wave of each pair, means for modulating the signals radiated by the third of said transmitting units with first and second reference signals having frequencies respectively related to the difference in frequency between the pairs of waves radiated during the first interval, means for rendering the first and a third of said units operative to radiate a third and fourth pair of carrier waves during a second interval, all of said carrier waves having a different frequency and each of said first and third units radiating one wave of each of said third and fourth pairs, means for modulating the signals radiated by the second of said transmitting units with third and fourth reference signals having frequencies respectively related to the difference in frequency between the waves of said third and fourth pairs, means for rendering the first of said units effective during a third interval to radiate only one of the carrier waves of said first and second pairs, means at least in part responsive to said one carrier wave for modulating the signals radiated by the said third unit with said first reference signal during said third interval, means for rendering said first unit effective during a fourth interval to radiate only one of the carrier waves of said third and fourth pairs, and means responsive at least in part to the one wave radiated by said first unit during the fourth interval for modulating the signals radiated by said second transmitting unit with said third reference signal.

10. A radio location system of the hyperbolic continuous wave type for determining the position of a mobile receiving point operating in a given area by providing phase indications which can be referred to a chart of the area in order to translate the phase indications into position information, said system comprising at least two spaced transmitting points each simultaneously radiating a pair of signals of different frequency; each transmitting point comprising a single radiating antenna adapted to emit both of the signals radiated therefrom, signal generating means for developing both of the signals to be radiated, a signal transmission channel having linear signal transfer characteristics for impressing both of the signals developed by the signal generating means upon said single antenna, and a circuit for additively and linearly combining the two signals developed by the signal generating means free of intermodulation components of the combined signals and for impressing the combined signals upon said channel for transmission to said antenna; means within said system for heterodyning at least two of said signals from different transmitting points at said receiving point and also at another point in the system; means for transmitting to said receiving point a reference signal derived from the heterodyne component obtained at said another point for comparison with the heterodyne component produced at the mobile receiving point in order to provide a fine position indication representative of the location of the mobile receiving point relative to a first set of hyperbolic, isophase lines on the chart having foci at the transmitting points; and means responsive to all four of the signals radiated from the two transmitting points for producing a coarse position indicated at the mobile receiving point representative of the location of the mobile receiving point relative to a second set of hyperbolic, isophase lines on the chart having foci at the transmitting points and having a spacing greater than the spacing between the isophase lines of the first set, the use of a single radiating antenna at each transmitting point permitting both sets of hyperbolic lines upon said chart to have common foci at the locations of said antennas.

11. The system defined by claim 10 wherein the signal transmission channel at each of the transmitting points includes a linear power amplifier.

12. The system defined by claim 11 wherein the power amplifier is operated class B.

13. The system defined by claim 11 wherein the power amplifier comprises a linear push-pull amplifier circuit.

14. A radio location system of the hyperbolic continuous wave type for determining the location of a mobile receiving point operating in a given area by providing phase indications which can be referred to a chart of the area in order to translate the phase indications into position information, said system comprising at least three spaced transmitting points each of which simultaneously radiates a pair of signals of distinguishable frequency; each transmitting point comprising a single radiating antenna adapted to emit both of the signals radiated therefrom, signal generating means for developing both of the signals to be radiated, a signal transmission channel having linear signal transfer characteristics for impressing both of the signals developed by the signal generating means upon said single antenna, and a circuit for additively and linearly combining the two signals developed by the signal generating means free of intermodulation components of the combined signal and for impressing the combined signals upon said channel for transmission to said antenna; means for heterodyning a first pair of signals respectively obtained from a first pair of said transmitting points and for heterodyning a second pair of signals obtained from a second pair of said transmitting points and for transmitting to said mobile receiving point first and second reference signals respectively derived from the heterodyne components; means at the mobile receiving point for reproducing the reference signals, for heterodyning said first pair of signals to develop a first beat signal and for heterodyning said second pair of signals to develop a second beat signal; means jointly responsive to the first beat signal and the first reference signal for providing a first fine position indication representative of the location of the mobile receiving point relative to a first set of hyperbolic isophase lines on said chart having foci at the first pair of transmitting points; means jointly responsive to the second beat signal and the second reference signal for providing a second fine position indication representative of the location of the mobile receiving point relative to a second set of hyperbolic isophase lines on said chart having foci at the second pair of transmitting points; means jointly responsive to all four of the signals radiated from the first pair of transmitting points for producing a first coarse position indication representative of the location of the mobile receiving point relative to a third set of hyperbolic isophase lines on the chart having foci at the first pair of transmitting points and having a spacing greater than the spacing between the isophase lines of the first set; and means responsive to all four of the signals radiated from the second pair of transmitting points for providing a second coarse position indication representative of the location of the mobile receiving point relative to a fourth set of hyperbolic isophase lines on the chart having foci at the second pair of transmitting points and having a spacing greater than the spacing between the isophase lines of the second set, the use of a single radiating antenna at each transmitting point permitting the first and third sets of hyperbolic lines on said chart to have common foci at the locations of the radiating antennas of the first part of transmitting points and also permitting the second and fourth sets of hyperbolic lines to have common foci at the location of the radiating antennas of the second pair of transmitting points.

15. The system defined by claim 14 wherein the signal transmission channel at each of the transmitting points includes linear power amplifier.

16. The system defined by claim 15 wherein the power amplifier is operated class B.

17. The system defined by claim 15 wherein the power amplifier comprises a linear push-pull amplifier circuit.

References Cited in the file of this patent

UNITED STATES PATENTS

| | | |
|---|---|---|
| 2,144,203 | Shanklin | Jan. 17, 1939 |
| 2,248,727 | Strobel | July 8, 1941 |
| 2,507,178 | Usselman | May 9, 1950 |
| 2,507,739 | Thompson | May 16, 1950 |
| 2,513,315 | Hawkins | July 4, 1950 |
| 2,598,290 | O'Brien | May 27, 1952 |
| 2,652,558 | Hawkins | Sept. 15, 1953 |
| 2,652,559 | Hawkins | Sept. 15, 1953 |